United States Patent
Chae

(10) Patent No.: US 7,234,011 B2
(45) Date of Patent: Jun. 19, 2007

(54) ADVANCED MICROCONTROLLER BUS ARCHITECTURE (AMBA) SYSTEM WITH REDUCED POWER CONSUMPTION AND METHOD OF DRIVING AMBA SYSTEM

(75) Inventor: Kwan-yeob Chae, Seoul (KR)

(73) Assignee: Samsung Electronics Co., Ltd. (KR)

( * ) Notice: Subject to any disclaimer, the term of this patent is extended or adjusted under 35 U.S.C. 154(b) by 172 days.

(21) Appl. No.: 10/993,885

(22) Filed: Nov. 19, 2004

(65) Prior Publication Data

US 2005/0138253 A1    Jun. 23, 2005

(30) Foreign Application Priority Data

Dec. 17, 2003   (KR) ...................... 10-2003-0092563

(51) Int. Cl.
*G06F 13/00* (2006.01)
*G06F 15/00* (2006.01)

(52) U.S. Cl. .................. 710/110; 710/316; 710/317; 712/31

(58) Field of Classification Search ................ 710/110, 710/316, 317; 712/31; 709/208
See application file for complete search history.

(56) References Cited

U.S. PATENT DOCUMENTS

| | | | |
|---|---|---|---|
| 5,754,865 A | | 5/1998 | Itskin et al. |
| 6,073,195 A | * | 6/2000 | Okada ........................ 710/301 |
| 6,442,642 B1 | | 8/2002 | Brooks ........................ 710/305 |
| 6,662,260 B1 | * | 12/2003 | Wertheim et al. ........... 710/316 |
| 6,871,256 B2 | * | 3/2005 | Drescher et al. ............. 711/101 |
| 7,069,376 B2 | * | 6/2006 | Mathewson et al. ........ 710/316 |
| 2002/0186042 A1 | | 12/2002 | Sihlbom et al. ............... 326/38 |
| 2002/0186043 A1 | | 12/2002 | Sihlbom et al. ............... 326/41 |
| 2003/0046478 A1 | | 3/2003 | Pertry et al. .................... 711/5 |

FOREIGN PATENT DOCUMENTS

| | | |
|---|---|---|
| EP | 1 187 028 | 3/2002 |
| JP | 02015356 | 1/1990 |
| JP | 2002-123484 | 4/2002 |
| KR | 010057920 | 7/2001 |
| KR | 10-2003-0056567 | 7/2003 |

OTHER PUBLICATIONS

ARM Limited. AMBA Specification. May 13, 1999. Rev. 20. http://www.gaisler.com/doc/amba/pdf.*
ARM Limited. AMBA Interconnection Schemes Application Note 05. 1998.*
Kim et al. AMBA Based Multiprocessor System. IEEE. 2003.*
Landry et al. Circuit Techniques for a 2 GHz AMBA AHB Bus. IEEE. 2005.*

* cited by examiner

*Primary Examiner*—Mark H. Rinehart
*Assistant Examiner*—Matthew Spittle
(74) *Attorney, Agent, or Firm*—Mills & Onello LLP

(57) ABSTRACT

In an advanced microcontroller bus architecture (AMBA) system with reduced power consumption, a signal transition is allowed to occur only in loads required for transferring bus signals by isolating loads on a bus signal transfer path requiring the signal transition from the other loads, so that the power consumption can be reduced in a bus architecture such as an advanced high-performance system bus (AHB).

25 Claims, 8 Drawing Sheets

ADVANCED MICROCONTROLLER BUS ARCHITECTURE (AMBA) SYSTEM WITH REDUCED POWER CONSUMPTION AND METHOD OF DRIVING AMBA SYSTEM

BACKGROUND OF THE INVENTION

This application claims the priority of Korean Patent Application No. 03-92563, filed on Dec. 17, 2003, in the Korean Intellectual Property Office, the disclosure of which is incorporated herein in its entirety by reference.

1. Field of the Invention

The present invention relates to a microcontroller, and more specifically, to an advanced microcontroller bus architecture (AMBA) system with reduced power consumption and a method of driving the AMBA system.

2. Description of the Related Art

In a the AMBA bus specification, developed by ARM Ltd., buses having different topologies, such as an advanced high-performance system bus (AHB), an advanced system bus (ASB), an advanced peripheral bus (APB), etc. are defined. Specifically, the advanced high-performance system bus (AHB) has a bus topology widely used in embedded microcontroller systems requiring high performance. In the above bus architectures, a bus signal is shared by many loads, and thus a large amount of power is wastefully consumed when a signal transition occurs in loads having no relation to a transfer path of a signal.

FIG. 1 is a block diagram illustrating an AHB topology of a conventional AMBA. In FIG. 1, bus signals such as address bus signals HADDR, and other bus signals HSIG such as transfer type signals, transfer direction signals, transfer size signals, burst type signals, and protection control signals, which are output from masters 111 to 114, are shared with slaves 131 to 134 under control of an arbiter signal HMASTER. Write data HWDATA output from the masters 111 to 114 are shared with the slaves 131 to 134 under control of an arbiter signal rHMASTER controlling a second multiplexer 122. Similarly, read data HRDATA, transfer ready signals HREADY, and transfer response signals HRESP, which are output from the slaves 131 to 134, are shared with the masters 111 to 114 under control of a decoder signal rHSEL controlling a third multiplexer 123.

FIG. 2 is a block diagram illustrating a capacitive load model of a write data bus of FIG. 1. In FIG. 2, the write data HWDATA are shared with the slaves 131 to 134 under control of the arbiter signal rHMASTER controlling the second multiplexer 122. For example, in the conventional AMBA, a signal transition occurs in all of buffer input loads $C_{G1}$ to $C_{G4}$, signal line loads $C_{W1}$ to $C_{W4}$, and slave input loads $C_{L1}$ to $C_{L4}$ at stages next to the second multiplexer 122, on transfer paths of bus signals for writing data. That is, the signal transition occurs in the overall capacitive loads on the paths with which the bus signals are shared. For this reason, when the write data HWDATA are transferred to a first slave 131 from a first master 111, any signal transitions that occur in the transfer also occur in the capacitive loads on the parallel paths routed toward the second slave 132, third slave 133 and fourth slave 134, which have no relation to the data write operation. Any signal transition that occurs in a load consumes power. Therefore, there is a problem that power is consumed wastefully due to the signal transitions occurring in the loads having no relation to transfer of the corresponding signals in the conventional AMBA. In addition, when the bus signals such as the read data HRDATA, the transfer ready signals HREADY, and the transfer response signals HRESP are transferred to the first master 111 from the first slave 131 so as to read out data, the corresponding bus signals are likewise transferred to and shared with all the masters 111 to 114, and thus these signal transitions also occur in all the loads on the transfer paths, thereby causing additional wasteful power consumption.

SUMMARY OF THE INVENTION

The present invention provides an advanced microcontroller bus architecture (AMBA) system with reduced power consumption in a bus architecture such as an advanced high-performance system bus (AHB).

The present invention also provides a method of driving the AMBA system with reduced power consumption in a bus architecture such as AHB.

According to an aspect of the present invention, there is provided an advanced microcontroller bus architecture (AMBA) system comprising a master block, a multiplexer circuit block, and a slave block. The master block comprises a plurality of masters, and a master obtaining bus occupation permission selectively outputs master bus signals or receives slave bus signals. The multiplexer circuit block outputs write data of the master bus signals only to a selected slave when outputting the master bus signals to slaves, receives the slave bus signals from a selected slave, and outputs the slave bus signals only to the master obtaining the bus occupation permission. The slave block comprises a plurality of slaves, receives the master bus signals, and stores the write data in the selected slave or outputs the slave bus signals including read data read out from the selected slave.

In one embodiment, the AMBA system may further comprise an arbiter that outputs a bus occupation permission signal giving the bus occupation permission to one of the masters and a master selection signal selecting the master obtaining the bus occupation permission in response to a bus occupation request signal received from each master. The AMBA system may further comprise a decoder that outputs a slave selection signal selecting one of the slaves. The master selection signal is selectively retained at a previous value or updated to a new value in accordance with a first logic state or a second logic state of a transfer ready signal representing transfer completion of the write data or the read data.

In another embodiment, the multiplexer circuit block further comprises a multiplexer circuit that receives and outputs signals other than the write data of the master bus signals output from a master of the masters obtaining the bus occupation permission under control of a bus occupation permission signal granting the bus occupation permission to the master of the masters. In one embodiment, the master bus signals include an address bus signal, a transfer type signal, a transfer direction signal, a transfer size signal, a burst type signal, and a protection control signal, in addition to the write data. The slave bus signals include a transfer ready signal and a transfer response signal, in addition to the read data.

In another embodiment, the multiplexer circuit block further comprises: a first multiplexer circuit that receives and outputs the write data output from a selected master of the masters under control of a master selection signal selecting a master obtaining the bus occupation permission; and a second multiplexer circuit that outputs the output signals of the first multiplexer circuit only to the selected slave under control of a slave selection signal selecting one of the slaves. The multiplexer circuit block can further comprise: a third multiplexer circuit that receives and outputs the slave bus signals from the selected slave under control of a slave selection signal selecting one of the slaves; and a fourth multiplexer circuit that outputs the output signals of the third multiplexer circuit only to a permitted master of the masters under control of a master selection signal selecting a master obtaining the bus occupation permission.

The transfer of the write data between the master obtaining bus occupation permission and the selected slave is loaded only by an input terminal of the selected slave and is not loaded by the input terminals of other non-selected slaves. Also, the transfer of the read data between the selected slave and the master obtaining bus occupation permission is loaded only by an input terminal of the master with bus occupation permission and is not loaded by the input terminals of other masters not having bus occupation permission.

The AMBA system is applicable to bus topologies including an advanced high-performance system bus (AHB), an advanced system bus (ASB), and an advanced peripheral bus (APB).

According to another aspect of the present invention, there is provided a method of driving an advanced microcontroller bus architecture (AMBA) system, the method comprising: outputting master bus signals from a master obtaining a bus occupation permission in a master block; outputting write data of the master bus signals only to a selected slave; and receiving the master bus signals and storing the write data of the master bus signals in the selected slave in a slave block.

The method of driving an AMBA system may further comprise: outputting slave bus signals read out from a selected slave in the slave block; outputting the slave bus signals only to a master obtaining the bus occupation permission; and allowing the master obtaining the bus occupation permission to receive the slave bus signals in the master block. The method of driving an AMBA system may further comprise outputting a bus occupation permission signal giving the bus occupation permission to one of the masters in response to a bus occupation request signal received from each of the masters of the master block. The method of driving an AMBA system may further comprise outputting a slave selection signal selecting one of the slaves of the slave block and a master selection signal selecting a master obtaining the bus occupation permission.

BRIEF DESCRIPTION OF THE DRAWINGS

The above and other features and advantages of the present invention will become more apparent from detailed description of exemplary embodiments thereof with reference to the attached drawings in which.

DETAILED DESCRIPTION OF PREFERRED EMBODIMENTS

Figure 1:
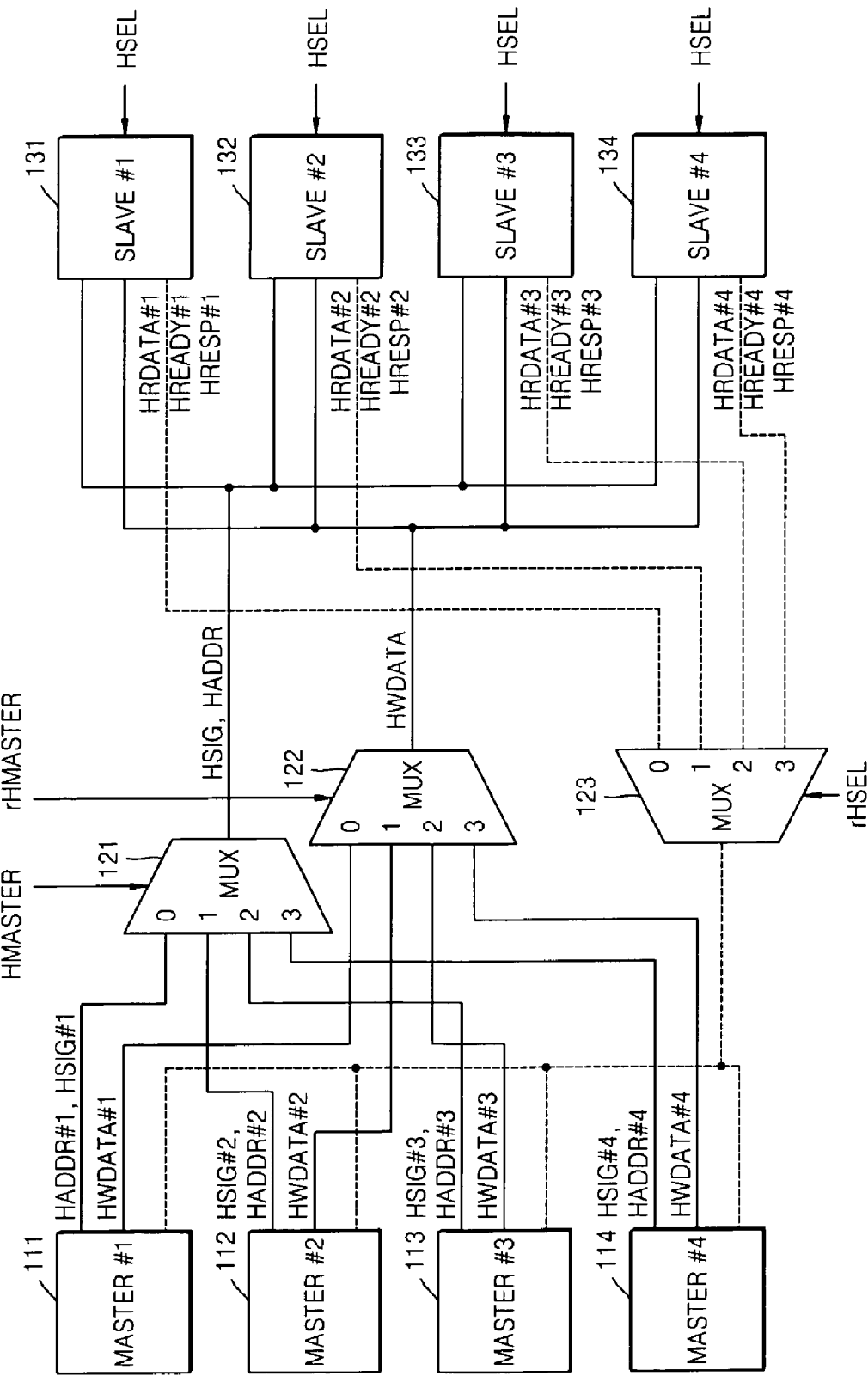
FIG. 1 is a block diagram illustrating an advanced high-performance bus (AHB) topology of a conventional advanced microcontroller bus architecture (AMBA)

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 3:
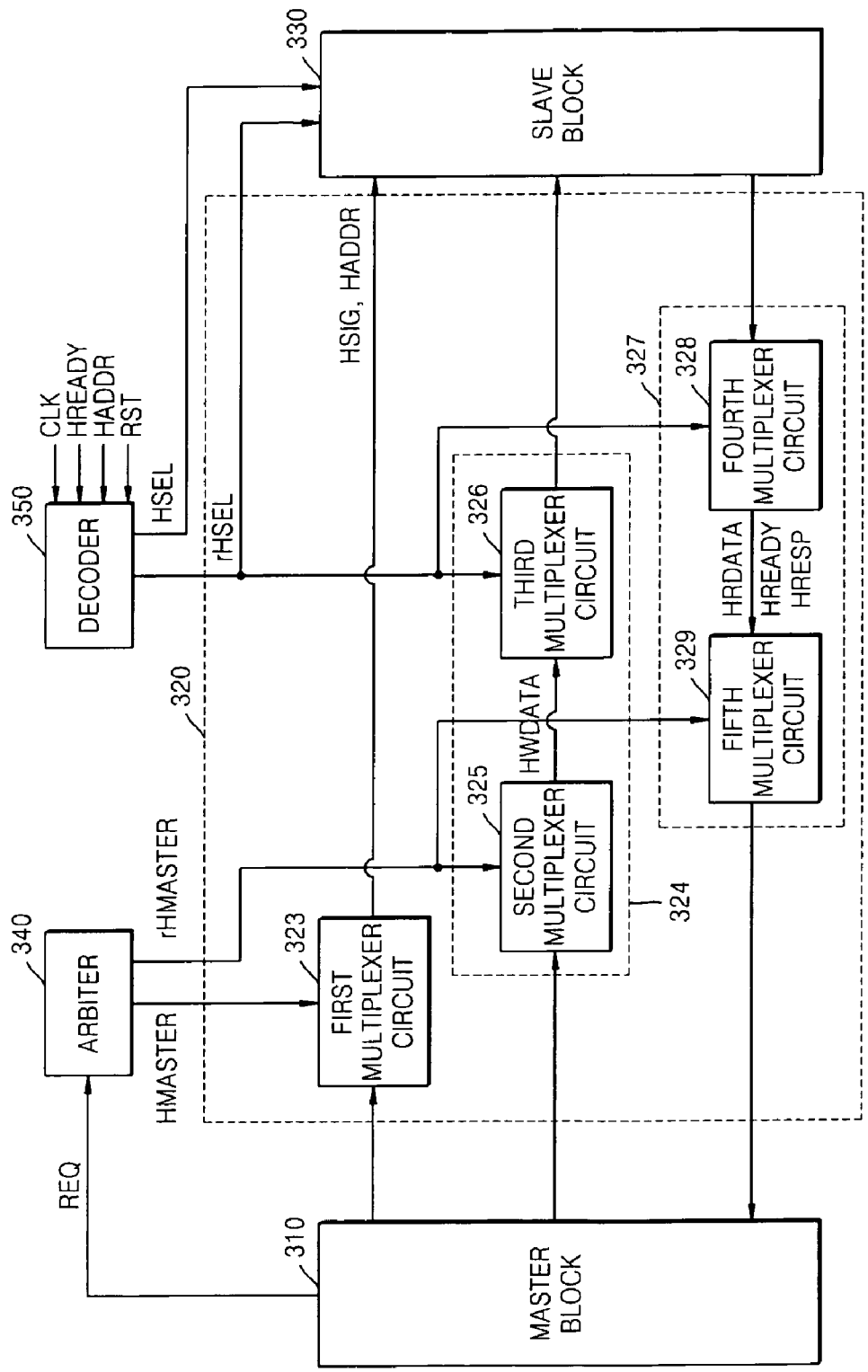
FIG. 3 is a block diagram illustrating an AMBA system according to an embodiment of the present invention.

FIG. 3 is a block diagram illustrating an advanced microcontroller bus architecture (AMBA) system according to an embodiment of the present invention. In FIG. 3, the AMBA system according to an embodiment of the present invention comprises a master block 310, a multiplexer circuit block 320, a slave block 330, an arbiter 340, and a decoder 350. The master block 310 comprises a plurality of masters, and the slave block 330 comprises a plurality of slaves. The AMBA system is applied to topologies of an advanced high-performance system bus (AHB), an advanced system bus (ASB), an advanced peripheral bus (APB), etc. which are bus specifications of the AMBA developed by ARM Ltd.

In FIG. 3, address bus signals HADDR output from the master block 310 are selected under control of a bus occupation permission signal HMASTER granting bus occupation permission to one of the masters, and are transferred to the slave block 330. Bus signals HSIG such as transfer type signals, transfer direction signals, transfer size signals, burst type signals, and protection control signals are transferred to the slave block in the same manner as the address bus signals HADDR. Write data HWDATA output from the master block 310 are transferred to the slave block 330 under control of a master selection signal rHMASTER selecting a master obtaining the bus occupation permission and a slave selection signal rHSEL. Read data HRDATA, transfer ready signals, HREADY, and transfer response signals HRESP output from the slave block 330 are transferred to the master block 310 under control of the master selection signal rHMASTER and the slave selection signal rHSEL. For the purpose of the present description, the write data HWDATA, the address bus signals HADDR, and other bus signals HSIG such as the transfer type signals, the transfer direction signals, the transfer size signals, the burst type signals, and the protection control signals are defined as master bus signals. The read data HRDATA, the transfer ready signals HREADY, and the transfer response signals HRESP are defined as slave bus signals.

The write data HWDATA are data to be stored in a slave designated by a master, and the read data HRDATA are data read out from a slave designated by a master. In addition, functions of the above bus signals are simply described in accordance with bus specifications of AMBA as follows. The address bus signals HADDR are addresses representing storage positions of a slave designated by a master. The transfer type signals HTRANS represent types of data to be being transferred and the types of data are classified into non-sequential, sequential, idle, and busy. The transfer direction signals HWRITE have a second logic state (a logically high state) when data are written to the slaves, and has a first logic state (a logically low state) when data are read out from the slaves. The transfer size signals HSIZE represent the size of data being transferred, and, in this example, the sizes of data are classified into a byte (8 bits), a half-word (16 bits), and a word (32 bits). The burst type signals HBURST represent that signals to be transferred presently are burst signals, and support burst signals of 4, 8, and 16 bits. The protection control signals HPROT represent additional information such as fetch of operation code (OP code) or data access. The transfer ready signals (HREADY) have a second logic state (a logically high state) when transfer of data is completed, and have a first logic state (a logically low state) when data is being transferred. The transfer response signals HRESP represent additional information on data transfer states, and, in this example, the data transfer states are classified into okay, error, retry, and split.

In the master block 310 comprising a plurality of masters, a master obtaining the bus occupation permission selectively outputs the master bus signals or receives the slave bus signals HRDATA, HREADY, HRESP. The operation of obtaining bus occupation permission by a master is carried out through the arbiter 340 that performs general bus arbitration. That is, the arbiter 340 outputs a bus occupation permission signal HMASTER granting bus occupation permission to one of the masters. In addition, the arbiter 340 outputs the master selection signal rHMASTER selecting a master obtaining the bus occupation permission. Since the master selection signal rHMASTER is generated using a circuit of FIG. 4, the generation of the master selection signal rHMASTER will be described in more detail in explanation with reference to FIG. 4.

The multiplexer circuit block 320 outputs the write data HWDATA of the master bus signals only to a selected slave when outputting the master bus signals to the slaves, receives the slave bus signals from a selected slave, and outputs the received slave bus signals only to a master obtaining the bus occupation permission. The multiplexer circuit block 320 is a key portion of the present invention, and thus will be described in more detail below. The selection of the slaves is carried out using the slave designation signal HSEL.

The slave block 330 comprising a plurality of slaves receives the master bus signals and stores the write data HWDATA of the master bus signals, or outputs the slave bus signals HRDATA, HREADY, HRESP including the read data read out from the selected slave.

Figure 4:
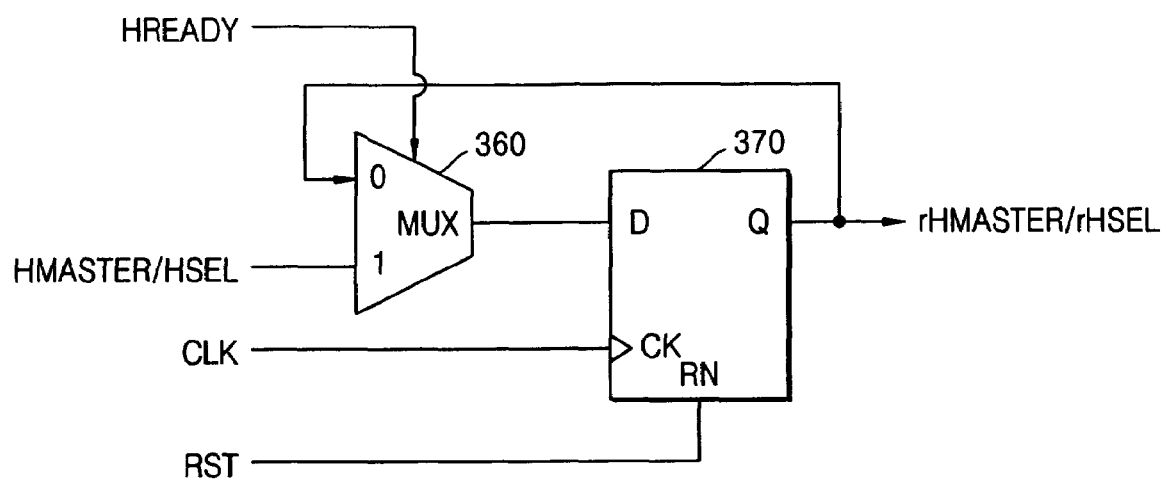
FIG. 4 is a diagram illustrating an output of the decoder of FIG. 3.

FIG. 4 is a diagram illustrating the output of the decoder 350 of FIG. 3. The decoder 350 comprises a two-input multiplexer 360 and a D flip-flop 370, and outputs the slave selection signal rHSEL selecting one of the slaves from the slave designation signal HSEL. As described above, the arbiter 340 outputs the master selection signal rHMASTER selecting a master obtaining the bus occupation permission from the bus occupation permission signal HMASTER by using the inner circuit shown in FIG. 4. The slave designation signal HSEL is a signal used by a master to designate a target slave when the master obtains the bus occupation permission, and is generated by decoding the address bus signals HADDR. The output signal rHMASTER/rHSEL of the D flip-flop 370 is reset in response to a reset signal RST, and updates the slave selection signal rHSEL and the master selection signal rHMASTER to new values at the next transition of the clock signal CLK, when the transfer ready signal HREADY representing transfer completion of the write data HWDATA or the read data HRDATA is in the second logic state (logically high state). When the transfer ready signal HREADY is in the first logic state (logically low state), the slave selection signal rHSEL and the master selection signal rHMASTER are retained at their previous values at the next trigger of the clock signal CLK. The bus occupation permission signal HMASTER and the master selection signal rHMASTER have digital values of plural bits in accordance with the number of masters, respectively. For example, when the master block 310 comprises four masters, the above signals have two bits. The slave designation signal HSEL and the slave selection signal rHSEL have digital values of plural bits in accordance with the number of slaves, respectively. For example, when the slave block 330 comprises four slaves, the above signals have two bits.

On the other hand, as shown in FIG. 3, the multiplexer circuit block 320 comprises a first multiplexer circuit 323, a first sub block 324 having a second multiplexer circuit 325 and a third multiplexer circuit 326, and a second sub block 327 having a fourth multiplexer circuit 328 and a fifth multiplexer circuit 329.

The first multiplexer circuit 323 transfers the signals other than the write data HWDATA of the master bus signals to the slave block 330 from the master block 310. That is, the first multiplexer circuit 323 receives the signals other than the write data HWDATA of the master bus signals output from a permitted master of the masters and outputs the received signals to the slave block 330 under control of the bus occupation permission signal HMASTER giving the bus occupation permission to one of the masters.

The first sub block 324 transfers the write data HWDATA of the master bus signals to the slave block 330 from the master block 310 through the second multiplexer circuit 325 and the third multiplexer circuit 326. That is, the second multiplexer circuit 325 receives and outputs the write data HWDATA output from the selected master of the masters under control of the master selection signal rHMASTER selecting a master obtaining the bus occupation permission. Accordingly, the third multiplexer circuit 326 outputs the output signals of the second multiplexer circuit 325 only to the selected slave under control of the slave selection signal rHSEL selecting one of the slaves.

The second sub block 327 transfers the slave bus signals HRDATA, HREADY, HRESP to the master block 310 from the slave block 330 through the fourth multiplexer circuit 328 and the fifth multiplexer circuit 329. That is, the fourth multiplexer circuit 328 receives and outputs the slave bus signals HRDATA, HREADY, HRESP from the selected slave under control of the slave selection signal rHSEL selecting one of the slaves. Accordingly, the fifth multiplexer circuit 329 outputs the output signals of the fourth multiplexer circuit 328 only to the selected master of the masters under control of the master selection signal rHMASTER selecting a master obtaining the bus occupation permission.

Operation of the multiplexer circuit block 320 according to an embodiment of the present invention will now be described in greater detail. In this embodiment of the present invention, by separating the loads of other paths having no relation to the signal transfer between the permitted master and the selected slave by using the bus occupation permission signal HMASTER, the master selection signal rHMASTER, and the slave selection signal rHSEL from loads required for the signal transfer, signal transition occurs only in the loads necessary for the signal transfer. In this manner, unnecessary signal transition is suppressed, and power consumption is thus reduced.

Figure 5:
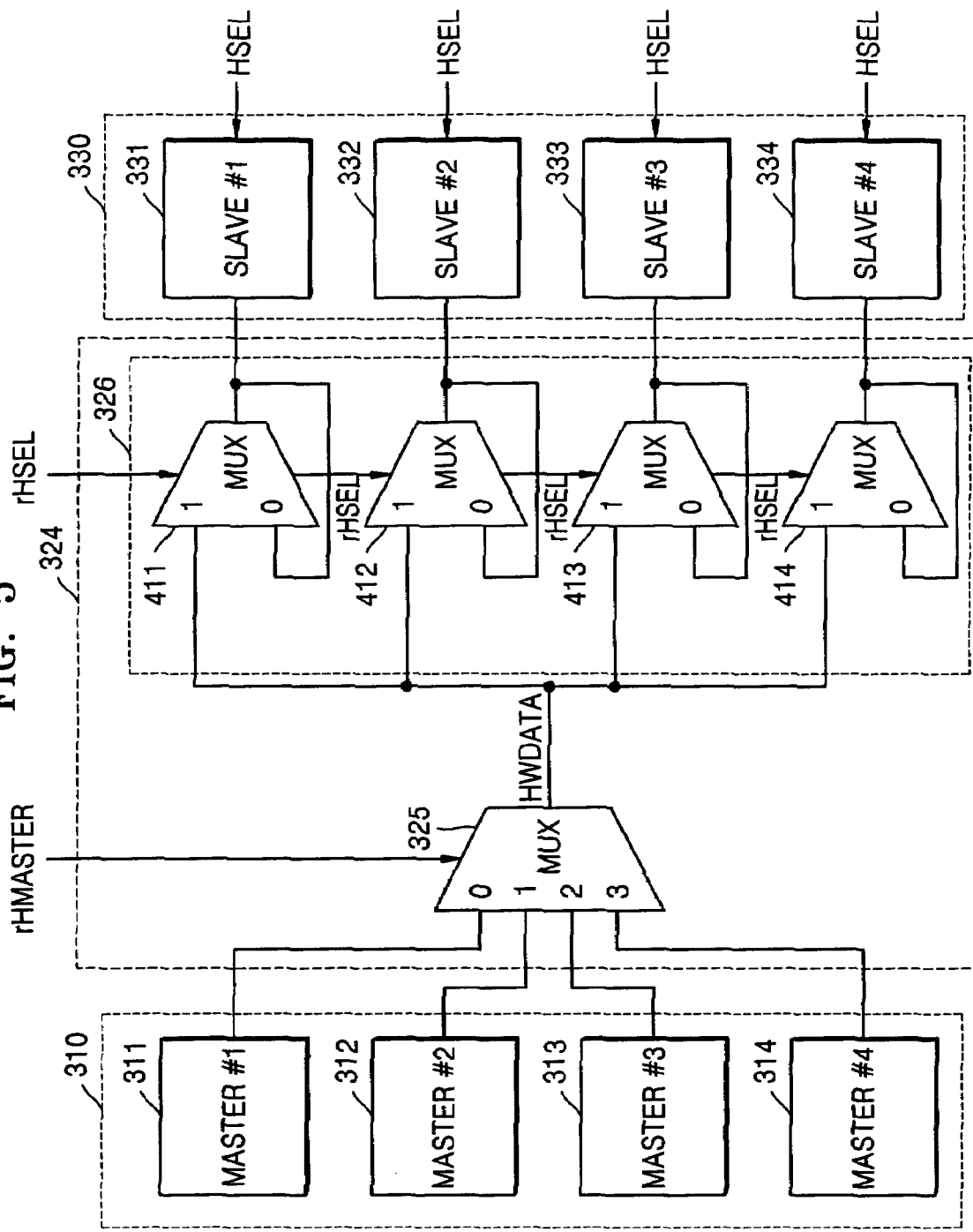
FIG. 5 is a block diagram illustrating connections of the write data bus of FIG. 3.
Figure 6:
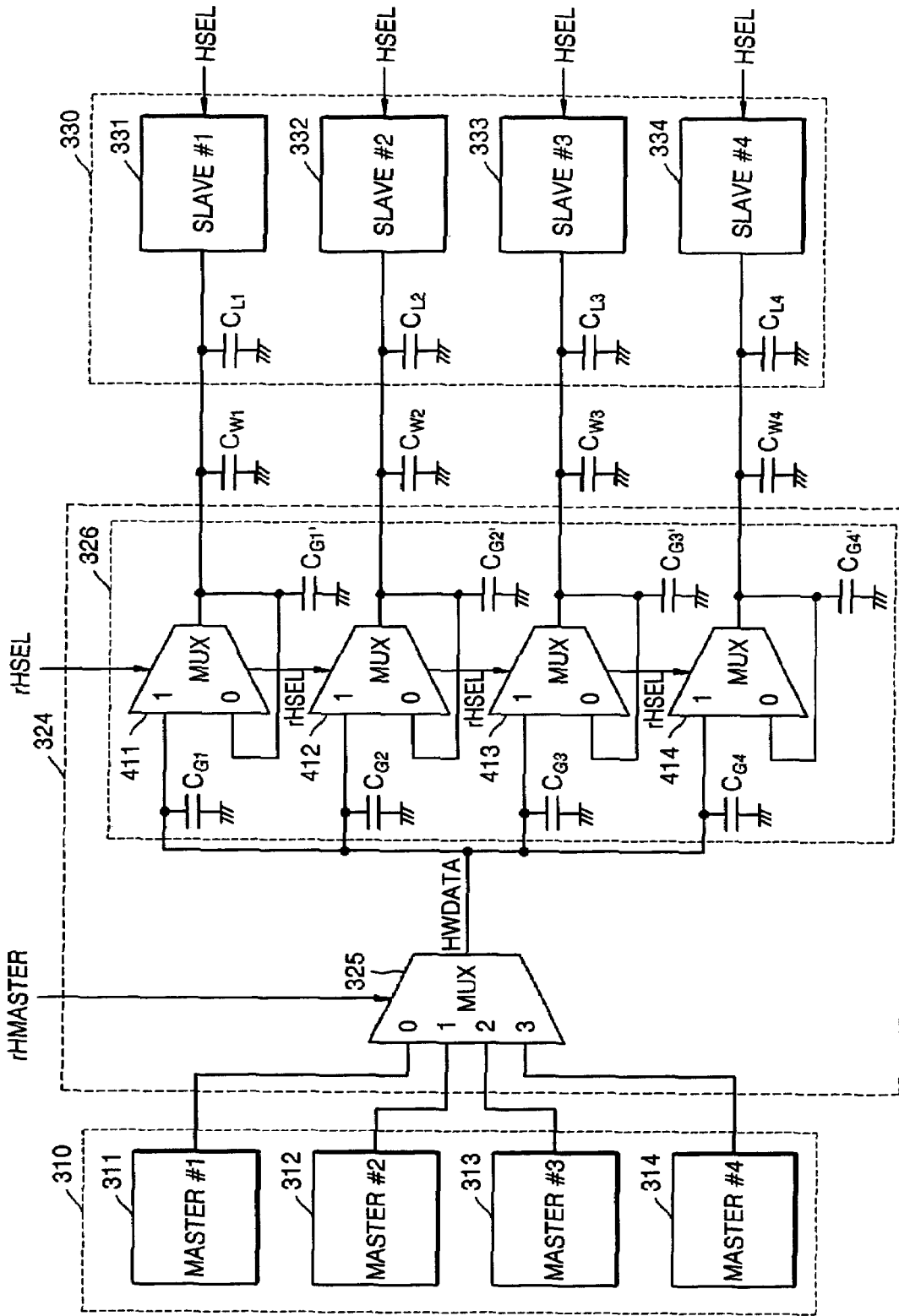
FIG. 6 is a block diagram illustrating a capacitive load model corresponding to FIG. 5.

FIG. 5 is a block diagram illustrating connections of the write data bus of FIG. 3. FIG. 6 is a block diagram illustrating a capacitive load model corresponding to FIG. 5.

In FIGS. 5 and 6, loads existing on the write data HWDATA bus transferring the write data HWDATA through the second multiplexer circuit 325 and the third multiplexer circuit 326 are isolated. The second multiplexer circuit 325 receives and outputs the write data HWDATA output from the permitted master of the masters 311 to 314 under control of the master selection signal rHMASTER. For example, when the master selection signal rHMASTER is digital signals of "00", "01", "10", and "11", respectively, the output signals of the first master 311 through the fourth master 314 are selected, respectively. The third multiplexer circuit 326 outputs the output signals of the second multiplexer circuit 325 only to the selected slave under control of the slave selection signal rHSEL. At this time, when the slave selection signal rHSEL is digital signals of "00", "01", "10", and "11", respectively, the output signals of the second multiplexer circuit 325 are output to one of the first slave 331 through the fourth slave 334 through one of two-input multiplexers 411 to 414. For example, when the first master 311 transmits the write data HWDATA to the first slave 331, the slave selection signal rHSEL is "00", and thus the output signals of the second multiplexer circuit 325 are output to the first slave 331 through the two-input multiplexer 411. Here, when the slave selection signal rHSEL is "00", the other two-input multiplexers 412 to 414 are not activated, and thus are not party to the signal transition, thereby holding previous values.

In the above example, when the first master 311 transmits the write data HWDATA to the first slave 331, as shown in FIG. 6, the total amount of capacitive loads on one bus signal includes input capacitances $C_{G1}+C_{G2}+C_{G3}+C_{G4}$ of the four two-input multiplexers 411 to 414, a single feedback capacitance $C_{G1'}$, a single capacitance $C_{W1}$ of a connection line, and a single input capacitance $C_{L1}$ of the first slave 331. Therefore, the consumed power is proportional to $[(C_{G1}+C_{G2}+C_{G3}+C_{G4})+C_{G1'}+C_{W1}+C_{L1}]$. As a result, the power consumption in this embodiment is still less than the power consumption of the conventional case shown in FIG. 2, which is proportional to $[(C_{G1}+C_{G2}+C_{G3}+C_{G4})+(C_{W1}+C_{W2}+C_{W3}+C_{W4})+(C_{L1}+C_{L2}+C_{L3}+C_{L4})]$. Assuming that there are n slaves in a given bus architecture, the total amount of capacitive loads for one bus signal on the conventional AHB write data HWDATA bus is $[(C_{G1}+C_{G2}+\ldots+C_{Gn})+(C_{W1}+C_{W2}+\ldots+C_{Wn})+(C_{L1}+C_{L2}+\ldots+C_{Ln})]$, and the total amount of capacitive loads in this embodiment of the present invention is $[(C_{G1}+C_{G2}+\ldots+C_{Gn})+C_{G1'}+C_{W1}+C_{L1}]$, which is less than that of the conventional AHB bus. As a result, it can be seen that the advantage of reducing the power consumption in the present invention becomes larger with increase in the number of slaves, by using the method according to this embodiment of the present invention.

Figure 7:
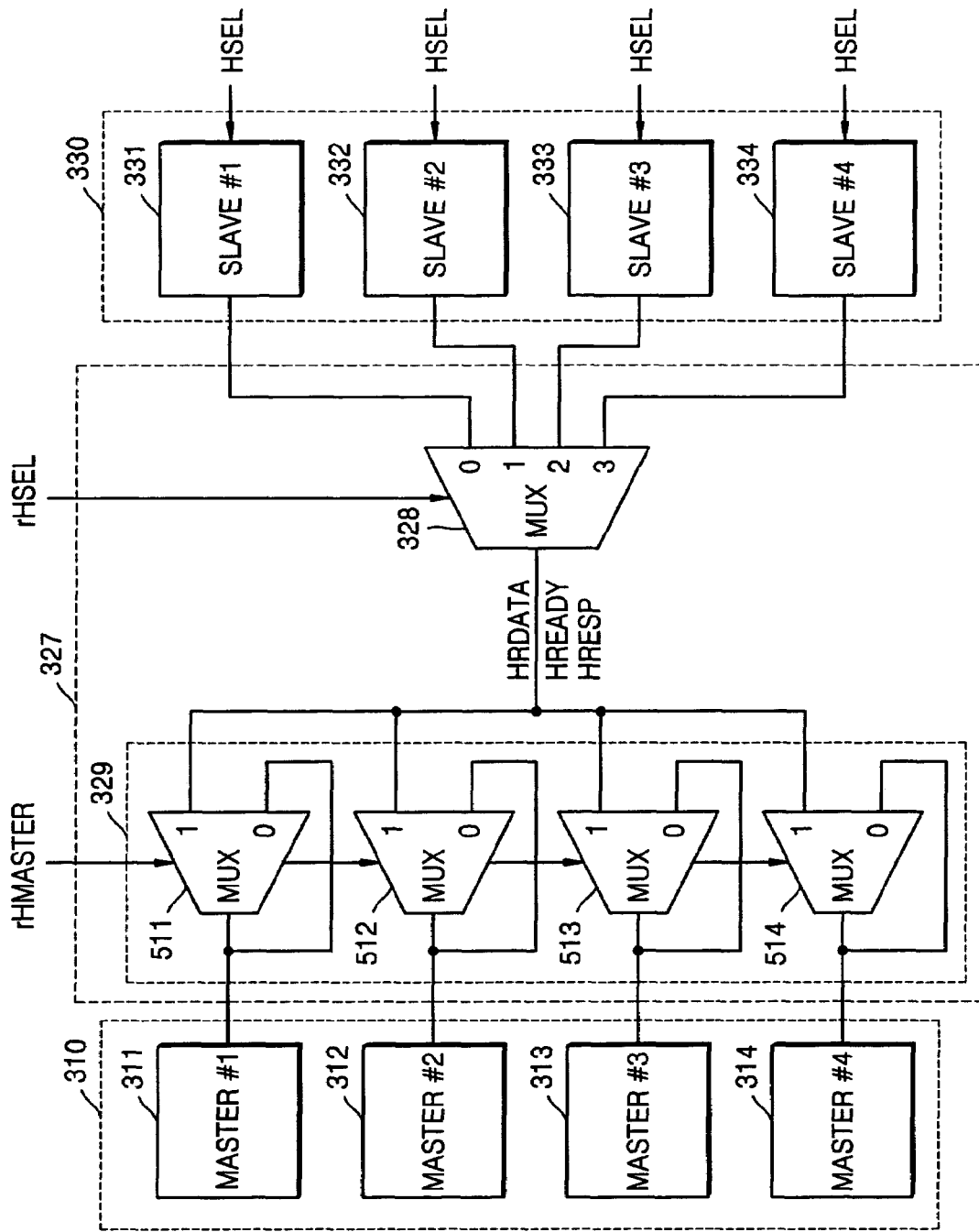
FIG. 7 is a block diagram illustrating connections of a read data bus of FIG. 3.
Figure 8:
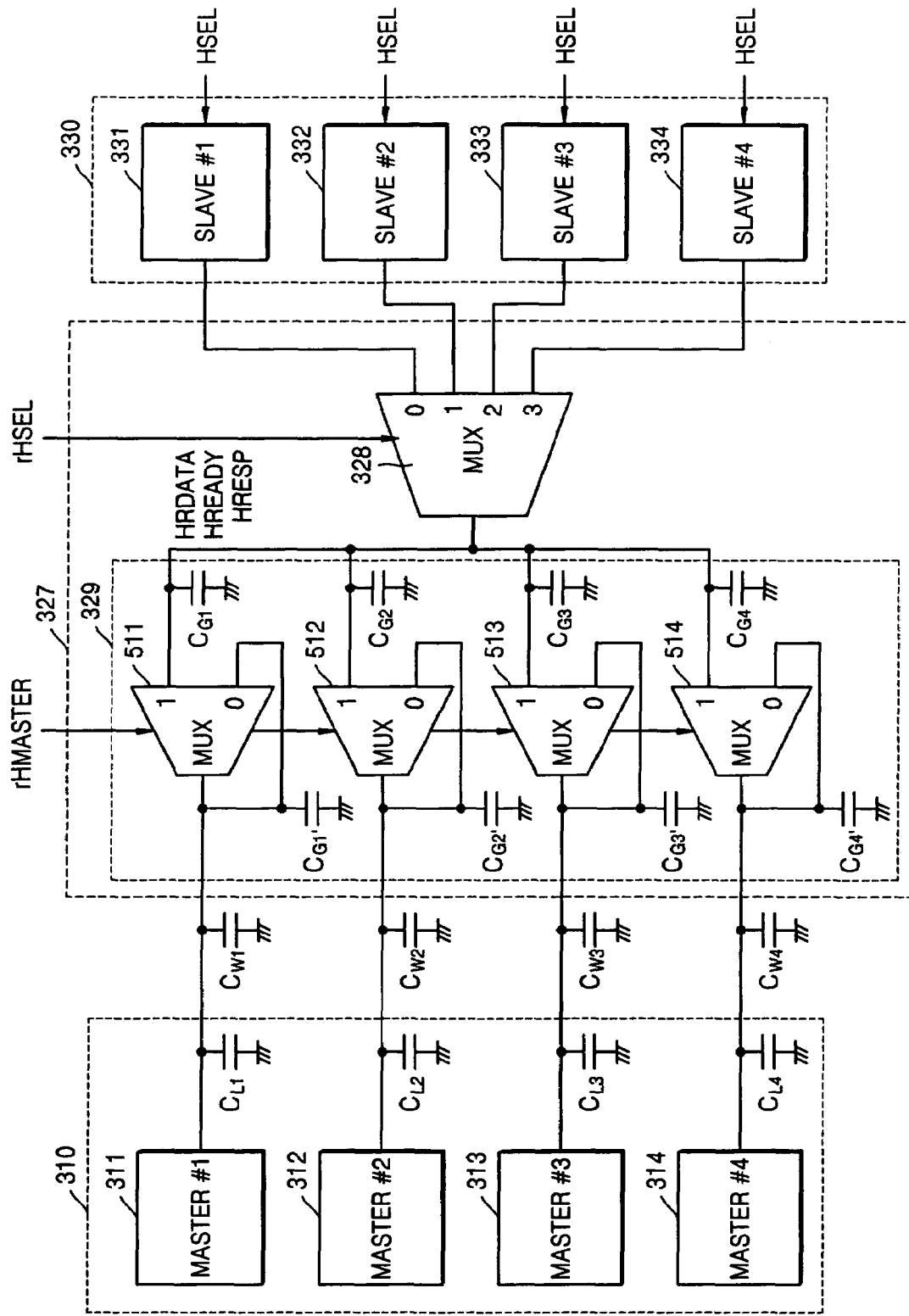
FIG. 8 is a block diagram illustrating a capacitive load model corresponding to FIG. 7.

FIG. 7 is a block diagram illustrating connections of the read data HRDATA bus of FIG. 3. FIG. 8 is a block diagram illustrating a capacitive load model corresponding to FIG. 7. The connections of the read data HRDATA bus are shown in FIG. 7, however, the connections involved in the transfer of other slave bus signals such as HREADY and HRESP are the same as that of the read data HRDATA bus shown in FIG. 7.

In FIGS. 7 and 8, loads existing on the read data HRDATA bus transferring the read data HRDATA through the fourth multiplexer circuit 328 and the fifth multiplexer circuit 329 are isolated. The fourth multiplexer circuit 328 receives and outputs the read data HRDATA output from the selected slave of the slaves 331 to 334 under control of the slave selection signal rHSEL. For example, when the slave selection signal rHSEL is digital signals of "00", "01", "10", and "11", respectively, the output signals of the first slave 331 through the fourth slave 334 are selected, respectively. The fifth multiplexer circuit 329 outputs the output signals of the fourth multiplexer circuit 328 only to the selected master under control of the master selection signal rHMASTER. At this time, when the master selection signal rHMASTER is digital signals of "00", "01", "10", and "11", respectively, the output signals of the fifth multiplexer circuit 329 are output to one of the first master 311 through the fourth master 314 through one of two-input multiplexers 511 to 514. For example, when the first master 311 reads out the read data HRDATA from the first slave 331, the master selection signal rHMASTER is "00", and thus the output signals of the fifth multiplexer circuit 329 are output to the first master 311 through the two-input multiplexer 511. Here, when the master selection signal rHMASTER is "00", the other two-input multiplexers 512 to 514 are not activated, and thus are not party to the signal transition, thereby holding previous values.

Figure 2:
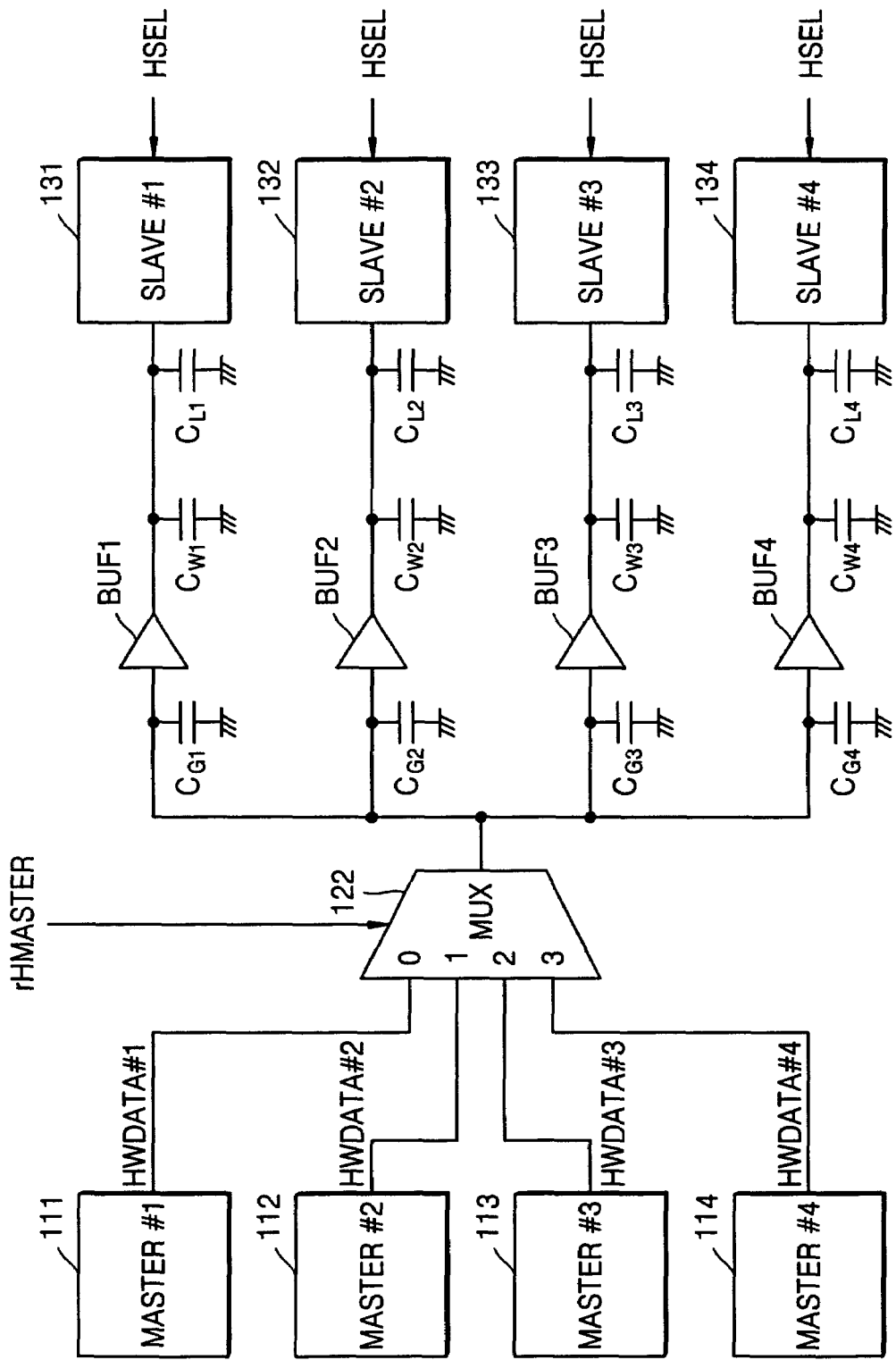
FIG. 2 is a block diagram illustrating a capacitive load model of a write data bus of FIG. 1.

With reference to the above description in FIGS. 6 and 7 of the resulting loading, the total amount of capacitive loading for a given single bus signal in FIG. 8 is less than the total amount of capacitive loading for a bus line of the conventional AHB read data HRDATA shown in FIG. 2. Therefore, if the apparatus and method according to this embodiment of the present invention is applied to the slave bus signals HRDATA, HREADY, HRESP, it is possible to reduce the power consumption, and the advantage of reducing the power consumption becomes even more striking as the number of masters increases.

As described above, in the advanced microcontroller bus architecture (AMBA) system according to an embodiment of the present invention, the signal transition is allowed to occur only in the loads necessary for transfer of the bus signals, by isolating the loads on the bus signal transfer path requiring the signal transition from the other loads. This leads to a reduction in the power consumption systems employing bus architectures such as AHB.

While the present invention has been particularly shown and described with reference to exemplary embodiments thereof, it will be understood by those skilled in the art that various changes in form and detail may be made herein without departing from the spirit and scope of the present invention as defined by the appended claims.

What is claimed is:

1. An advanced microcontroller bus architecture (AMBA) system comprising:

a master block comprising a plurality of masters, in which a master obtaining a bus occupation permission selectively outputs master bus signals or receives slave bus signals;

a multiplexer circuit block that outputs write data of the master bus signals only to a selected slave when outputting the master bus signals to slaves in response to a slave selection signal, receives the slave bus signals from a selected slave, and outputs the received slave bus signals only to the master obtaining the bus occupation permission in response to a master selection signal, wherein the multiplexer circuit block comprises a first sub block and a second sub block; and a slave block that comprises a plurality of slaves, receives the master bus signals, and stores the write data in the selected slave or outputs the slave bus signals including read data read out from the selected slave, the slave selection signal being applied to the first sub block to provide a first single data path between a first master obtaining a first bus occupation permission and a first selected slave, wherein the write data is transferred from the first master obtaining the bus occupation permission to the first selected slave through the first single data path, and the master selection signal being applied to the second sub block to provide a second single data path between a second selected slave and a second master obtaining a second bus occupation permission, wherein the slave bus signals including the read data are transferred from the second selected slave to the second master through the second single data path.

2. The AMBA system according to claim 1, further comprising an arbiter that outputs a bus occupation permission signal granting the bus occupation permission to one of the masters and the master selection signal further selecting the master obtaining the bus occupation permission in response to a bus occupation request signal received from each master.

3. The AMBA system according to claim 2 wherein the master selection signal is selectively retained at a previous value or updated to a new value in accordance with a first logic state or a second logic state of a transfer ready signal representing transfer completion of the write data or the read data.

4. The AMBA system according to claim 1, further comprising a decoder that outputs the slave selection signal selecting one of the slaves.

5. The AMBA system according to claim 4, wherein the slave selection signal is selectively retained at a previous value or updated to a new value in accordance with a first logic state or a second logic state of a transfer ready signal representing transfer completion of the write data or the read data.

6. The AMBA system according to claim 1, wherein the multiplexer circuit block comprises a multiplexer circuit that receives and outputs signals other than the write data of the master bus signals output from a master of the masters obtaining the bus occupation permission under control of a bus occupation permission signal granting the bus occupation permission to the master of the masters.

7. The AMBA system according to claim 1, wherein the master bus signals includes an address bus signal, a transfer type signal, a transfer direction signal, a transfer size signal, a burst type signal, and a protection control signal, in addition to the write data.

8. The AMBA system according to claim 1, wherein the first sub block of the multiplexer circuit block comprises:
a first multiplexer circuit that receives and outputs the write data output from a selected master of the masters under control of the master selection signal selecting a master obtaining the bus occupation permission; and
a second multiplexer circuit that outputs the output signals of the first multiplexer circuit only to the selected slave under control of the slave selection signal selecting one of the slaves.

9. The AMBA system according to claim 1, wherein the second sub block of the multiplexer circuit block comprises:
a third multiplexer circuit that receives and outputs the slave bus signals from the selected slave under control of the slave selection signal selecting one of the slaves; and
a fourth multiplexer circuit that outputs the output signals of the third multiplexer circuit only to a permitted master of the masters under control of the master selection signal selecting the master obtaining the bus occupation permission.

10. The AMBA system according to claim 1, wherein the slave bus signals include a transfer ready signal and a transfer response signal, in addition to the read data.

11. The AMBA system according to claim 1, wherein the AMBA system is applied to topologies of an advanced high-performance system bus (AHB), an advanced system bus (ASB), and an advanced peripheral bus (APB).

12. The AMBA system according to claim 1, wherein transfer of the write data between the master obtaining bus occupation permission and the selected slave is loaded only by an input terminal of the selected slave and is not loaded by the input terminals of other non-selected slaves.

13. The AMBA system according to claim 1, wherein transfer of the read data between the selected slave and the master obtaining bus occupation permission is loaded only by an input terminal of the master with bus occupation permission and is not loaded by the input terminals of other masters not having bus occupation permission.

14. A method of driving an advanced microcontroller bus architecture (AMBA) system, the method comprising:
outputting master bus signals from a master of a master block obtaining a bus occupation permission;
outputting write data of the master bus signals only to a selected slave of a slave block in response to a slave selection signal that is applied to a first sub block of a multiplexer circuit block;
receiving the master bus signals and storing the write data of the master bus signals in the selected slave in the slave block;
providing a first single data path between a first master obtaining a first bus occupation permission and a first selected slave when the slave selection signal is applied to the first sub block, wherein the write data is transferred from the first master obtaining the bus occupation permission to the first selected slave through the first single data path; and
providing a second single data path between a second selected slave and a second master obtaining a second bus occupation permission when a master selection signal is applied to a second sub block of the multiplexer circuit block, wherein the slave bus signals including the read data are transferred from the second selected slave to the second master through the second single data path.

15. The method according to claim 14, further comprising: outputting slave bus signals read out from the selected slave in the slave block; outputting the slave bus signals only to the master obtaining the bus occupation permission; and
receiving the slave bus signals at the master of the master block that obtains the bus occupation permission.

16. The method according to claim 15, further comprising:
outputting a bus occupation permission signal giving the bus occupation permission to one of the masters in response to a bus occupation request signal received from each of the masters of the master block.

17. The method according to claim 14, further comprising:
outputting the slave selection signal selecting one of the slaves of the slave block and the master selection signal selecting a master obtaining the bus occupation permission.

18. The method according to claim 17, wherein the master selection signal and the slave selection signal are selectively retained at previous values or updated to new values in accordance with a first logic state or a second logic state of a transfer ready signal representing transfer completion of the write data or the read data.

19. The method according to claim 15, further comprising:

receiving and outputting signals other than the write data of the master bus signals output from a master of the masters obtaining the bus occupation permission under control of a bus occupation permission signal giving the bus occupation permission to one of the masters.

20. The method according to claim 14, wherein the master bus signals includes an address bus signal, a transfer type signal, a transfer direction signal, a transfer size signal, a burst type signal, and a protection control signal, in addition to the write data.

21. The method according to claim 14, wherein the outputting of the master bus signals comprises:

receiving and outputting the write data output from a selected master of the masters under control of the master selection signal selecting a master obtaining the bus occupation permission; and outputting the write data only to the selected slave under control of the slave selection signal selecting one of the slaves.

22. The method according to claim 15, wherein the outputting of the slave bus signals comprises:

receiving and outputting the slave bus signals from the selected slave under control of the slave selection signal selecting one of the slaves; and outputting the slave bus signals only to a selected master of the masters under control of the master selection signal selecting a master obtaining the bus occupation permission.

23. The method according to claim 15, wherein the slave bus signals include a transfer ready signal and a transfer response signal, in addition to the read data.

24. The method according to claim 14, wherein transfer of the write data between the master obtaining bus occupation permission and the selected slave is loaded only by an input terminal of the selected slave and is not loaded by the input terminals of other non-selected slaves.

25. The method according to claim 14, wherein transfer of the read data between the selected slave and the master obtaining bus occupation permission is loaded only by an input terminal of the master with bus occupation permission and is not loaded by the input terminals of other masters not having bus occupation permission.

* * * * *